United States Patent Office
3,439,090
Patented Apr. 15, 1969

3,439,090
METHOD FOR EXTRACTING THE ANTIBIOTIC LEVORIN FROM A CULTURE MEDIUM
Valjter Osvaljdovich Kuljbakh, Leonid Borisovich Sokolov, and Jury Fedorovich Sveshnikov, Leningrad, and Olja Alexandrovna Kuznetsova and Galina Nickolaevna Malinovskaja, Penza, and Valentina Jakovlevna Raigorodskaja and Galina Vasiljevna Kholodova, Leningrad, U.S.S.R., assignors to Leningradsky nauchno-issledovateljsky institute antibiotikov, Leningrad, U.S.S.R.
No Drawing. Filed June 4, 1964, Ser. No. 373,137
Int. Cl. A61k 21/00; C07g 11/00
U.S. Cl. 424—124                                        9 Claims

ABSTRACT OF THE DISCLOSURE

A method for extracting the antibiotic levorin from a culture medium in which the organism Actinomyces levoris Kras., strain 26/1 has been grown.

The method comprises adding a diatomite to the culture medium, adjusting the pH to 5.5–5.8, thereby causing the levorin and impurities to be adsorbed on the diatomite. The diatomite precipitates and is separated from the medium, after which the diatomite is treated with methylene chloride to extract impurities. Then the diatomite is treated with a lower alkanol or ketone to extract levorin therefrom.

This invention relates to a method of obtaining the anti-fungal antibiotic 26/1, levorin (WHO Chronicle, 1965, vol. 19, No. 11, p. 6), belonging to the group of aromatic heptaenes of the polyene series.

Methods are known for obtaining the antibiotic levorin, comprising two stages of production: isolation of crude levorin and its purification, in which the culture fluid after fermentation by Actinomyces levoris Kras. is treated with a diatomite for adsorption of levorin from the crude solution, the filtered and dried mycelium-diatomite mass extracted twice with water-saturated n-butanol, the butanol extract evaporated under diminished pressure, and the crude levorin which crystallizes on cooling filtered off from the mother liquor and dried under diminished pressure. The crude product is freed from biologically inactive impurities by washing repeatedly with dry acetone at 40° C., with subsequent washing with rectified ethanol and drying of the residue under diminished pressure or by dissolving the purified crude product in a 1–2% methanol solution of calcium chloride, filtering off impurities and precipitating the antibiotic from this solution by diluting with two volumes of water, separating, washing with water and lyophilization of the aqueous suspension of levorin.

The disadvantages of these methods when used industrially are that the repeated vacuum drying of the antibiotic results in its inactivation, the use of inflammable and toxic solvents such as ethanol, methanol and hot acetone cause a deterioration in working conditions, the product has an increased ash content when precipitated from a calcium chloride solution, and a low yield of the product (not higher than 30% on the activity basis), as well as the use of high-boiling and insufficiently selective solvents, result in inactivation of the antibiotic while evaporating and in contamination of the crude levorin with levoristatin, a toxic antibiotic of non-polyene character yielded by the producing microorganism, which involves complicated, labour consuming and costly purification.

The object of the present invention is to increase the yield of the final product, improve its quality and ensure greater safety of the process.

It has now been established that levoristatin, the other biologically active substance elaborated by the producing microorganism, Actinomyces levoris Kras., a non-polyene substance related to actidion and streptovitacin which is present in the mycelium along with levorin, can be completely removed together with oily impurities, both those synthesized by Actinomyces and those added during fermentation as antifoam agents, by treating the mycelium-diatomite mass twice with two volumes of methylene chloride. During this operation methylene chloride selectively dissolves the oily impurities and levoristatin without dissolving levorin.

It has been found that extraction of levorin from the methylene chloride-treated mycelium-diatomite mass which has been freed from levoristatin and oily impurities can be performed by means of cheaper, low boiling and more selective solvents, such as an azeotropic mixture of industrial isopropyl alcohol and water, or 80% aqueous acetone. It is sufficient to extract three times with two volumes of the azeotropic mixture of isopropyl alcohol and water or twice with two volumes of 80% aqueous acetone.

The lower boiling point of the isopropanol or aqueous acetone extract as compared to that of the butanol extract makes possible evaporation to $\frac{1}{8}$–$\frac{1}{9}$ of the volume under less drastic conditions, the temperature of the water-bath being 35–40° C. and the pressure 20–30 mm. Hg, preferably in a film-type evaporator. Levorin can also be precipitated from the aqueous acetone extract with two volumes of water. The antibiotic precipitated from the concentrate on cooling to +4° C. is filtered off from the mother liquor and treated on a pressure filter with methylene chloride (700 ml. per $1 \times 10^9$ units of activity) or 27% aqueous acetone so as completely to remove oily impurities and levoristatin. The squeezed out residue is dried at room temperature and a pressure of 20–30 mm. Hg.

For a better understanding of the invention by those skilled in the art the following examples are given by way of illustration.

Example 1

675 g. of diatomite are added to 45 liters of culture fluid having an activity of 8,000 units per ml., and the mixture is stirred for 2 hours; the pH is then adjusted to 5.8 with 2 N solution of hydrochloric acid, and the mixture filtered on a pressure filter. 2 kg. of mycelium-diatomite mass with an activity of 175,000 units per g. are obtained; the said mass is treated with 8 liters of methylene chloride, 4 liters for each extraction; filtered mass is extracted with 12 liters of 79% isopropyl alcohol (4 liters for each extraction); the combined isopropanol extract is evaporated at 40° C./20 mm. to 1.2 liters after the concentrate has been allowed to stand at +4° C. for 20 hrs., the precipitated antibiotic is filtered off on a vacuum filter, washed with 0.45 liter of methylene chloride and dried in a vacuum drying-oven at room temperature. 9.9 g. of levorin with an activity of 22,800 units per mg. are obtained, which constitutes 64.3% of the activity of the mycelium-diatomite mass. The yield in terms of weight is 220 mg. per liter of culture fluid.

Example 2

960 g. of diatomite are added to 64 liters of culture fluid with an activity of 13,500 units per ml. After stirring, adjusting the pH to 5.5 and filtering, 3.8 kg. of mycelium-diatomite mass with an activity of 145,000 units per g. are obtained. The amount of methylene chloride used for washing is 15.2 liters. 22 liters of 79% isopropanol are consumed in extraction. 21 liters of isopropanol extract with an activity of 27,000 units per ml. are decanted. The extract is evaporated at 40° C./20 mm. to 2.5 liters and after standing at +4° C. for 20 hrs.

the precipitated antibiotic is filtered off on a Büchner funnel and dried under diminished pressure.

17 g. of levorin with an activity of 17,500 units per mg. are obtained, this constituting 53.8% of the activity of the mycelium-diatomite mass. The yield in terms of weight is 260 mg. per liter of culture fluid.

Example 3

2,100 g. of Lapland diatomite are added to 300 liters of culture fluid with an activity of 6,400 units per ml. After stirring, adjusting the pH to 5.6 and filtering, 10.3 kg. of mycelium-diatomite mass are obtained; the said mass is treated twice with 41.2 liters of methylene chloride, 20.6 liters for each extraction, and then extracted twice with 80% aqueous acetone, 20.6 liters for each extraction. Levorin is precipitated from the acetone filtrate by mixing with two volumes of water at 25° C.; the suspension is kept at this temperature for 2 hrs. and then cooled to +4° C. and held at this temperature for 12 hrs. The precipitate is filtered off on a Büchner funnel, washed with 27% aqueous acetone and dried in a vacuum drying-oven. The yield is 36.5 of levorin powder with an activity of 25,000 units per mg., or 47.5% of the activity of the culture fluid.

It should be noted that the present invention makes it possible to obtain a yield of levorin of not less than 46% of its content in the mycelium without the use of toxic products.

What we claim is:

1. A method for extracting the antibiotic levorin produced by cultivation of the organism *Actinomyces levoris* Kras., strain 26/1 in a culture medium, said method comprising adding a diatomite to a culture medium in which the organism has been grown, adjusting the pH of the culture medium to about 5.5–5.8 to cause levorin and impurities contained in the culture medium to be partially adsorbed on the diatomite and partially precipitated from the culture medium, separating the diatomite on which said levorin and impurities have been adsorbed and the precipitated levorin and impurities from the culture medium, extracting the thusly separated diatomite and precipitated matter at least once with methylene chloride to remove said impurities, extracting the diatomite and precipitated matter from which impurities have been removed at least once with a water miscible organic solvent selected from the group consisting of low molecular weight alcohols and ketones to remove levorin therefrom and isolating levorin from the latter extract.

2. A method as claimed in claim 1 wherein the pH is adjusted with hydrochloric acid.

3. A method as claimed in claim 1 wherein the organic solvent is isopropanol.

4. A method as claimed in claim 3 comprising adding water to the isopropanol.

5. A method as claimed in claim 1 wherein the organic solvent is acetone.

6. A method as claimed in claim 5 comprising adding water to the acetone.

7. A method as claimed in claim 1 wherein the amount of the water miscible organic solvent is at least 2 times the weight of the separated diatomite and precipitated matter.

8. A method as claimed in claim 1 wherein levorin is isolated from the said latter extract by crystallization from 80% aqueous acetone.

9. A method as claimed in claim 1 wherein levorin is isolated from the said latter extract by precipitation with cold water.

References Cited

Chemical Abstracts, vol. 60, May 1964, p. 11851.

ALBERT T. MEYERS, *Primary Examiner*.

D. M. STEPHENS, *Assistant Examiner*.

U.S. Cl. X.R.

424—120, 121